March 4, 1952  O. THALMAN  2,587,790
BICYCLE KICK STAND
Filed Aug. 3, 1949
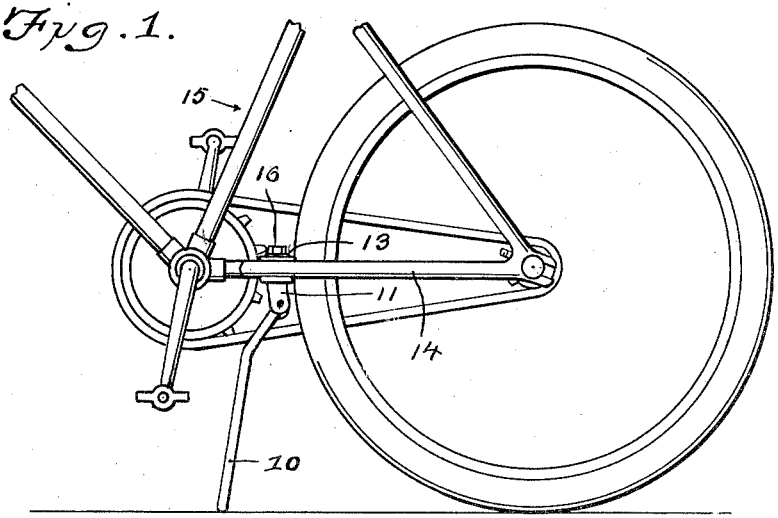
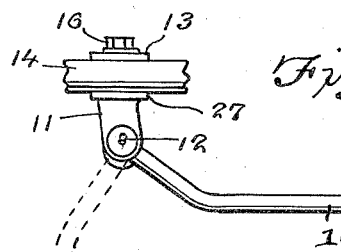
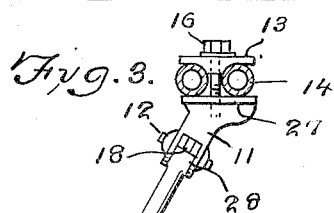
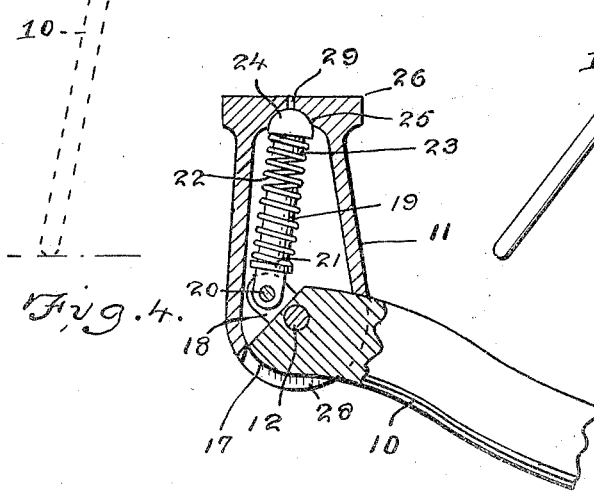
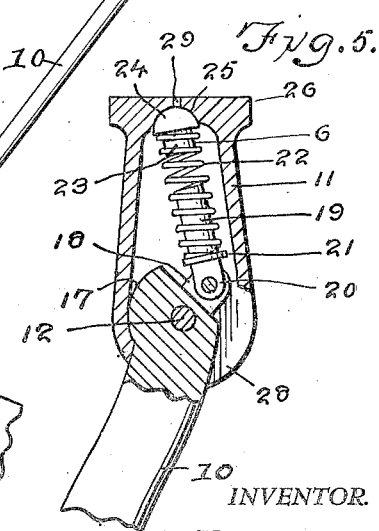
INVENTOR.
Otto Thalman
BY Victor J. Evans & Co.
ATTORNEYS Patented Mar. 4, 1952

2,587,790

UNITED STATES PATENT OFFICE 2,587,790

BICYCLE KICK STAND

Otto Thalman, Chevy Chase, Md.

Application August 3, 1949, Serial No. 108,297

1 Claim. (Cl. 280—301)

This invention relates to supporting stands for bicycles of the type permanently attached to the bicycle and particularly of the kick stand type, and in particular the invention includes a kick stand having an arm pivotally mounted in a socket on the bicycle frame and in which the arm is pivotally mounted in the socket and held in operative or inoperative position by a toggle action.

The purpose of this invention is to provide an improved kick stand for bicycles in which the supporting arm is pivotally mounted and positively held in both the operative and inoperative positions so that the possibility of play normally developing in kick stands of this type is substantially eliminated.

In the usual type of kick stand where the arm rubs over a projection or part of the frame wear develops in the parts, and, particularly with the arm in the supporting position the play is so great that it is difficult to support a bicycle with the arm. With this thought in mind this invention contemplates an arm that is positively supported on a shaft and in which means is provided for holding the arm in operative and inoperative positions whereby pressure is applied to the arm regardless of the amount of wear that may develop in the mounting elements.

The object of this invention is, therefore, to provide mounting means for supporting a kick stand arm on the frame of a bicycle wherein force is applied to the arm continuously throughout the movement from one position to the other and in both positions thereof.

Another object of the invention is to provide a kick stand mounting socket that may readily be applied to bicycles of different types.

A further object of the invention is to provide a kick stand in which the supporting arm thereof is pivotally held in a socket and resiliently held in both operative and inoperative positions, which is of a simple and economical construction.

Other features and advantages of the invention will appear from the following description taken in connection with the drawings wherein Figure 1 is a view showing a side elevation of a bicycle with the improved kick stand mounted thereon and with parts broken away.

Figure 2 is a side elevational view on an enlarged scale showing the arm of the kick stand in the inoperative position in full line and in the supporting position in dot and dash lines.

Figure 3 is a cross sectional view illustrating the mounting of the kick stand on the lower part of the bicycle stand.

Figure 4 is a cross section through the socket of the kick stand on a still further enlarged scale and showing the supporting arm in the inoperative position.

Figure 5 is a similar view showing the arm in the supporting position.

Referring now to the drawings, wherein like reference characters denote corresponding parts, the improved bicycle kick stand of this invention includes an arm 10 pivotally mounted in a socket or bracket 11 on a pin 12, and a clamp 13 by which the bracket is fixedly mounted on a frame 14 of a bicycle 15 by a bolt 16, the bracket being shaped to define the socket therein.

The arm 10 is provided with a hub 17 through which it is pivotally mounted on a pin or shaft 12 and the shaft is journaled in the side walls of the socket 11. The hub 17 of the arm 10 is provided with a projection 18 through which the lower end of a stud 19 is pivotally attached by a pin 20 and the stud is provided with a collar 21 which provides a seat for the lower end of a spring 22, the upper end of which is held on a stem 23 of a semi-spherical head 24 that is positioned in a recess 25 in the upper end 26 of the socket 11.

The upper end of the bracket 11 is formed with a flange 27 that is clamped against the under surfaces of the bars 14 of the bicycle frame by the bolt 16 with the clamp 13 bearing against the upper surfaces of the bars of the frame.

The lower end of the socket 11 is provided with a slot or opening 28 through which the support arm 10 extends and when the bicycle is in use the arm 10 is snapped upwardly to the position shown in Figures 2 and 4 wherein the projection 18 is positioned on one side of the center of the shaft 12 and the spring 23 positively holds the arm in this position.

When it is desired to support the bicycle with the stand the arm 10 is moved downwardly in the position shown in Figure 5 and also in the position indicated by the dot and dash lines in Figure 2 and during this movement the pin 20 is snapped over the center of the shaft 12 and the spring 22 positively holds the arm in this position. By this means the supporting arm is positively held in both the operative and inoperative positions and it requires very little effort to compress the spring and move the pin 20 over the center to adjust the arm to the operative or inoperative positions.

The flange 27 on the upper end of the bracket 11 is provided with a small lubricating opening 29 which communicates with the socket in which the head 24 is positioned and through which lubricant may be supplied to the operating parts of the device.

It will be understood that modifications may be made in the design and arrangement of the parts without departing from the spirit of the invention.

What is claimed is:

A kick stand for a bicycle, comprising a bracket having a flange on its upper end, a clamp for securing the bracket against the bicycle frame, there being a socket arranged in said bracket, the upper portion of said bracket having a semi-spherical bearing recess communicating with said socket, a semi-spherical head movably positioned in said recess, a stem extending from said head and secured thereto, there being a slot arranged in the bottom of said bracket, an arm having a hub movably positioned in said slot, a shaft extending through said hub and bracket for pivotally connecting said arm to said bracket, a projection extending from said hub and secured thereto, a stud having one end pivotally connected to said projection, an annular collar arranged on said stud, and a coil spring having one end abutting said collar and its other end extending over said stem and abutting said head.

OTTO THALMAN.

REFERENCES CITED

The following references are of record in the file of this patent:

FOREIGN PATENTS

| Number | Country | Date |
|---|---|---|
| 197,463 | Switzerland | July 16, 1938 |
| 245,869 | Switzerland | Aug. 1, 1947 |
| 256,373 | Great Britain | Aug. 12, 1926 |